W. W. BLAKELY.
METHOD OF MANUFACTURING SECURING DEVICES.
APPLICATION FILED JAN. 26, 1918.

1,327,852. Patented Jan. 13, 1920.

Inventor
William W. Blakely.

By Whittemore Hulbert & Whittemore
Attorneys

UNITED STATES PATENT OFFICE.

WILLIAM W. BLAKELY, OF DETROIT, MICHIGAN.

METHOD OF MANUFACTURING SECURING DEVICES.

1,327,852.  Specification of Letters Patent.  Patented Jan. 13, 1920.

Application filed January 26, 1918. Serial No. 213,968.

*To all whom it may concern:*

Be it known that I, WILLIAM W. BLAKELY, a citizen of the United States of America, residing at Detroit, in the county of Wayne and State of Michigan, have invented certain new and useful Improvements in Methods of Manufacturing Securing Devices, of which the following is a specification, reference being had therein to the accompanying drawings.

This invention relates to a method of manufacturing holding devices such as are used in securing automobiles or other articles in place during shipment, and to other similar devices such as handles and holders of various kinds.

Among the objects of the invention are to provide an improved method of manufacturing a holding device of the character above-mentioned whereby a strong holder having a fabric or other soft central portion can be quickly and economically produced, and the invention also resides in such steps and combination of steps in the manufacture of such devices as will more fully hereinafter appear.

In the drawings in which I have illustrated one form of apparatus by which my improved method of manufacture may be carried out and also the device in its completed form:

Describing first the article with reference to its use for holding an automobile in place while being shipped, A designates one of the wheels of the automobile and B the block for preventing forward movement of the wheel. For holding the wheel from vertical movement I employ the securing device C which has a central or body portion D looped over the felly of the wheel and has its opposite ends E and F nailed to the floor G. The securing device is so formed that a plurality of bearing or securing portions are arranged at spaced points, the entire construction being preferably formed from two wires having their ends bent and provided at the central portions with a fabric or other textile covering twisted into or interlocked with the wire. The detailed arrangement of the end portions is as follows: Near each end the wires H and I are bent as follows: The wire H is first bent at H' rearwardly toward the opposite end and then is looped at $H^2$ from which there projects a diagonally extending portion $H^3$ terminating in a loop $H^4$. The wire I is similarly bent, but in a reverse direction to provide a return-bent portion I' having a loop $I^2$, and a diagonally extending portion $I^3$ terminating in a loop $I^4$. The loops $I^2$ and $I^4$ and $H^2$ and $H^4$ form four bearing or securing portions through which nails, staples or the like can be driven, while in addition to these loops a further loop J is formed in the twisted portion L and L', this last loop being preferably formed during the twisting.

Figure 1:
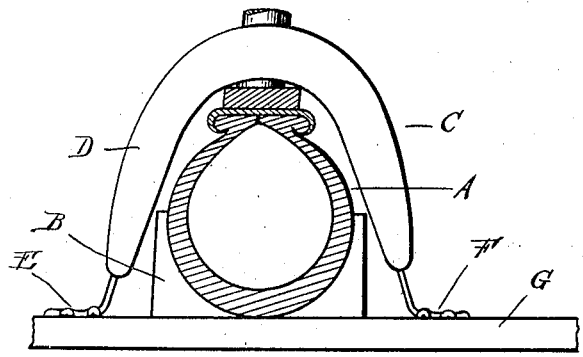
Figure 1 is a fragmentary sectional view showing the device employed for holding the wheel of an automobile.
Figure 2:
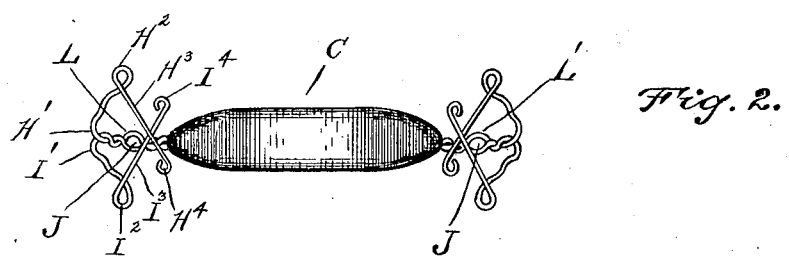
Fig. 2 is a top plan view of the securing device.
Figure 3:
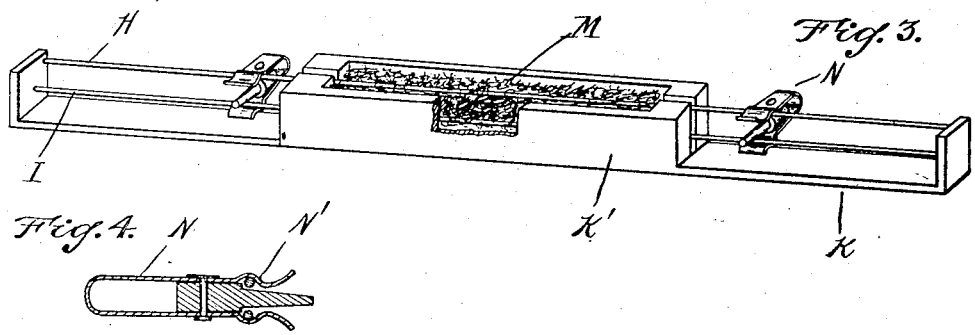
Fig. 3 is a perspective view showing the first step in the manufacture.
Figure 4:
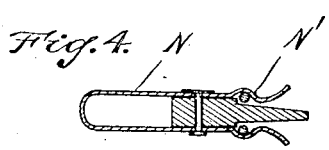
Fig. 4 is an enlarged sectional view through one of the clips.
Figure 5:
Fig. 5 is a view showing the partly completed device.

Taking up in detail the method of forming the article, I have illustrated in Fig. 3 one of the first steps which comprises laying the wire H in the bottom of the holder K and then filling the box K' with cotton waste or other textile material M. The wires are then engaged by the clip members N having the spring clip N' for holding the wires. The article is then removed from the holder and placed in a lathe or other suitable turning device and the twisted portions L and L' formed. When, however, the holding device N is withdrawn it leaves the loops J, as shown in Fig. 5. The ends of the wire are then bent in a suitable forming machine to provide the return-bent portions or loops I', $I^2$, etc., and the article preferably curved into the form shown in Fig. 1.

In this method of manufacture it is therefore possible by taking a couple of pieces of wire and a quantity of cotton waste or other textile material to rapidly and economically form them into a securing device which has a central main body portion of material sufficiently soft not to injure the article held while its ends have spaced loops adapted to receive nails or the like so as to rigidly hold the securing device in position.

What I claim as my invention is:—

1. The method of forming padded securing devices which comprises positioning padding material between wire portions, twisting the wire portions to interlock the padding material and fashioning the ends of the wires to form securing portions.

2. The method of forming securing devices which comprise positioning padding material between a pair of wire members, clipping the wire members to maintain a fixed relation, twisting the wires to interlock the padding material firmly with the wire members, and fashioning the ends to form spaced securing portions.

3. The method of forming padded securing devices which comprises interlocking cotton waste or like material with twisted wire portions and fashioning the ends of the wire portions to form securing portions.

4. The method of forming securing devices which comprises positioning padding material between wire portions, clipping the wire portions on each end of the padding material to maintain a fixed relation between the wires and padding, twisting the wire to interlock the padding material firmly with the wire members and then fashioning the ends of the wire to form securing loops.

In testimony whereof I affix my signature.

WILLIAM W. BLAKELY.